United States Patent Office 3,223,577
Patented Dec. 14, 1965

3,223,577
SILYLATED POLYEPOXIDES
Edwin P. Plueddemann, Midland, Mich., assignor to Dow Corning Corporation, Midland, Mich., a corporation of Michigan
No Drawing. Filed May 19, 1961, Ser. No. 111,147
11 Claims. (Cl. 161—193)

This invention relates to polyepoxide resins containing silyl groups and to the use of such materials on siliceous materials.

This application is a continuation-in-part of applicant's copending application Serial No. 86,601, filed February 2, 1961, now abandoned.

With the advent of improved organic molding resins such as polyesters and epoxy resins, there has been the perennial problem of maintaining under highly humid conditions the strength of molded articles comprising such resins and siliceous fillers. There has also been the problem of increasing the dry strength of such molded articles.

Improvements in this direction have resulted in applying to the siliceous filler certain methacrylato chromium chloride complexes and certain vinylsilanes. However, in general, the flexural strength of polyester laminates obtained using siliceous fillers treated with methacrylato chromium chloride complexes or vinylsilanes runs between 50,000 to 60,000 p.s.i. The strength generally drops 10 percent or more under humid conditions. Thus, the wet strength of such molded articles is in the range from 45,000 to 50,000 p.s.i.

It is one of the objects of this invention to provide novel compositions of matter. Another object is to provide materials which will increase the strength of molded articles comprising siliceous fillers and organic resins. Another object is to provide a material which can be added to organic resins prior to molding with siliceous fillers and which will cause the resulting molded articles to have increased strength. Another object is to provide novel compositions of matter which can be copolymerized with other organic resins to form new and improved laminating resins. Other objects and advantages will be apparent from the following description.

This invention relates to silylated polyepoxides in which the silyl moiety is attached to the epoxide moiety through a silicon-carbon-bond, said silyl moiety being of the formula $$(RO)_{3-n}\overset{(CH_3)_n}{\underset{|}{Si}}-$$

in which R is of the group consisting of monovalent aliphatic hydrocarbon radicals and monovalent monocarboxy acyl radicals, of less than 4 carbon atoms and $n$ is an integer from 0 to 2 inclusive and in which said epoxide moiety is composed of carbon, hydrogen and oxygen atoms, the later being in the form of epoxy groups, in said silylated polyepoxide there being at least 3 epoxy groups and at least one silyl group per molecule.

The characterizing features of the composition of this invention resides in the fact that there are at least 3 epoxy groups $$(-C\overset{O}{\overset{\diagup\diagdown}{\rule{1.5em}{0pt}}}C-)$$

per molecule and the fact that the silicon atoms are attached to the polyepoxide moiety through silicon-carbon-bonds.

For the purpose of this invention the organosilyl groups can be of the type $(RO)_3Si-$, $$(RO)_2\overset{CH_3}{\underset{|}{Si}}-$$

or $$RO\overset{(CH_3)_2}{\underset{|}{Si}}-$$

In each case R can be any aliphatic hydrocarbon radical of less than 4 carbon atoms such as methyl, ethyl, propyl or allyl, or any monocarboxy acyl radical of less than 4 carbon atoms such as formyl, acetyl or propionyl. If desired, the silicon atom can have both alkoxy and acyloxy groups attached thereto.

The compositions of this invention can be prepared in two ways. The first is by reacting silanes of the formula $$(RO)_{3-n}\overset{(CH_3)_n}{\underset{|}{Si}}H$$

wherein $n$ is as above defined with polyepoxides containing $$\overset{\diagdown}{\rule{0pt}{1em}}C=C\overset{\diagup}{\rule{0pt}{1em}}$$

unsaturation. This reaction is best carried out by heating a mixture of the silane and the polyepoxide at temperatures such as for example from 50 to 150° C. in the presence of colloidal platinum. The platinum catalyst can be of any dispersed form such as solutions of chloroplatinic acid or platinum dispersed on charcoal or other carriers. The reaction can also be carried out in the presence of peroxide catalysts such as bonzoyl peroxide which promotes the addition of the silane to the $$\overset{\diagdown}{\rule{0pt}{1em}}C=C\overset{\diagup}{\rule{0pt}{1em}}$$

linkages.

Alternatively the instant compositions can be prepared by reacting an alkenyl silane of the formula $$(RO)_{3-n}\overset{(CH_3)_n}{\underset{|}{Si}}R'$$

wherein $n$ is as above defined where R' is an alkenyl group such as vinyl, allyl, etc., with the unsaturated polyepoxides. This reaction is best carried out employing peroxide catalysts such as benzoyl peroxide, t-butylperbenzoate or t-butylperoxides. The reaction proceeds at temperatures above the decomposition point of the peroxide. The free radicals thus generated cause the alkenyl group of the silane to graft to the epoxide moiety presumably at or adjacent to the $$\overset{\diagdown}{\rule{0pt}{1em}}C=C\overset{\diagup}{\rule{0pt}{1em}}$$

groups in the epoxide molecules.

The silane may graft to the epoxide as a monomer to give a configuration such as $$-\overset{O}{\overset{\diagup\diagdown}{\underset{|}{CH}-CH}}CH_2CHCH_2-$$
$$\underset{|}{CH_2}$$
$$\underset{|}{H_2CSi(OR)_{3-n}}$$
$$(CH_3)_n$$

or the alkenyl silane may first form a polymer via alkenyl polymerization which polymer grafts to the expoxide chain i.e.

$$-\overset{O}{\overset{\diagup\diagdown}{\underset{|}{CH}-CH}}CH_2CHCH_2CH_2-$$
$$\left[\underset{|}{\underset{|}{CH_2}\atop CHSi(OR)_3}\right]_x$$
$$\underset{|}{CH_2}$$
$$CH_2Si(OR)_3$$

where $z$ can be any positive number.

Both of the above configurations are within the scope of this invention. It can be seen that regardless of whether the silane is attached through an SiH addition or through a polymeric or polymeric alkenyl graft, in all of the resulting products the "silyl moiety is attached to the epoxy moiety through a SiC linkage."

Polyepoxides which are employed to make the compositions of this invention are characterized by having at least one

linkage and at least 3 epoxy groups per molecule. Preferably the polyepoxide should have at least 5 epoxy groups per molecule. It is also desirable that the epoxide have more than one

group per molecule. In carrying out the reaction with the silane, it is not necessary that all of the unsaturated linkages in the epoxide be silylated. In fact, it is highly desirable that some

linkages remain unreacted. In such cases the product will contain 3 distinct types of functional groups, namely the epoxide group, the

group and the —OR groups attached to the silicon atom.

The amount of silylation of the epoxide can be controlled by the molar ratio of silane to

groups and by the temperature and amount of Pt or peroxide catalyst used during the reaction. For any given concentration of silane the amount of silylation increases with increasing time of reaction, temperature of reaction and catalyst concentration.

The structure of the polyepoxide moieties can best be understood by reference to their method of preparation. The best method of preparing these materials is by first polymerizing conjugated olefins such as butadiene or isoprene in any of the conventional ways. If desired, the conjugated olefin can be copolymerized with other olefins. Thus, for example, the butadiene can be copolymerized with styrene, vinylcyclohexene, isobutylene, ethylene or any other olefin.

In all polymers or copolymers of conjugated olefins, there is residual

linkages. These linkages can be converted into epoxy groups by heating a mixture of the polymerized olefin with peracids, such as peracetic acid. In such a procedure it is often desirable to employ solvents such as acetic acid, toluene or the like. A more detailed description of this method preparing epoxides is given by D. Swern, Chemical Review, vol. 45, pp. 1 to 69 (1949).

In carrying out the epoxidizing step, the number of residual unsaturated groups remaining is determined by the amount of peracid employed. Thus, by using less than enough peracid to oxidize all of the double bonds, one obtains a polyepoxide which has residual

linkages. These linkages are then free to react with SiH compounds or with alkenyl silanes as above described, to produce the silylated polyepoxides of this invention.

Some of the unsaturated polyepoxides employed herein are commercial products which are sold under the designation Oxiron resins.

It should be understood that there is no critical upper limit to the number of epoxy groups or silyl groups per molecule in the compositions of this invention. Thus, so long as the material is in a dispersible form, the molecular weight thereof is not critical.

The structure of the polyepoxide moiety of the compositions of this invention is not critical. Thus, the polyepoxide moiety can be linear, branched or cyclic in structure. Also the main chain of the polyepoxide moiety can contain pendent groups such as phenyl groups, cyclohexyl groups, or cyclohexenyl groups. By the same token, the position of the epoxide groups is not critical. Thus, the epoxide group may appear in the main chain or on a group pendent to the main chain. Also the epoxy group can appear in a pendant aliphatic group or a pendent cycloaliphatic group.

The term "composed essentially of," as employed in the specification and claims with respect to the epoxy moiety means that the moiety is composed primarily of carbon, hydrogen and oxygen atoms, the latter being in the form of an epoxy group. However, the epoxy moiety can also contain small amounts of hydroxyl groups or carboxyester groups. These latter two groups are often found in commercial polyepoxides which are prepared by oxidizing unsaturated polyolefins with peracids. The groups are formed by a side reaction of the by-produced acid with the epoxide group

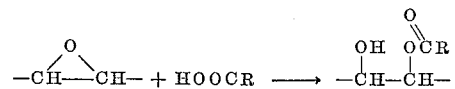

It should be understood that the claims of this invention include within their scope compositions containing such by-produced groups.

Thus, an example of a typical molecular configuration within the scope of this invention is

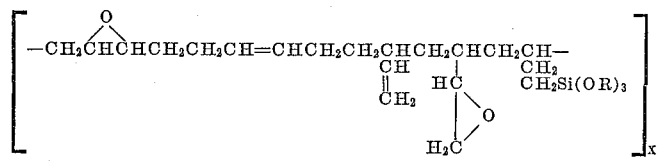

In addition there can be some groups of the type

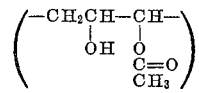

in place of some of the epoxide groups.

One of the primary uses of the compositions of this invention is in the sizing of siliceous materials to improve the strength of the bond between the siliceous material and organic resins. The term, siliceous material, as employed herein has reference to such materials as glass, asbestos, silica and silicates, such as aluminum silicate, magnesium aluminum silicate and the like. Thus, this term includes any water insoluble inorganic compound containing silicon and oxygen.

For the purpose of this invention the siliceous material can be in the form of fibers or woven fabrics or in a particulated form.

The compositions of this invention can be applied to the surface of the siliceous material by any suitable method such as by dipping, spraying or brushing. After the material has been applied, the siliceous material is dried and is preferably heated for 1 to 10 minutes at temperatures of from 150° to 200° F. in order to fix the material on the surface of the siliceous material.

If desired, instead of first treating the siliceous material with the compositions of this invention and thereafter mixing them with the organic molding resin, one can mix the compositions of this invention with the organic molding resin and thereafter add the siliceous material. Apparently under these conditions, the compositions of this invention will be preferentially absorbed on the surface of the siliceous material and will act in the same manner as if they were placed on the surface of the latter prior to mixing with the organic resin.

In order to be effective, the compositions of this invention must be employed in amount of at least .1 percent by weight based on the weight of the siliceous material. There is no critical upper limit to the amount of material employed. However, there is no advantage in going above 5 percent when the compositions are to be used as finishes.

The compositions of this invention are useful with any organic molding resin such as, for example, vinylic resins such as styrene, vinyl chloride, methylacrylate, methylmethacrylate; epoxide resins such as copolymers of epichlorohydrin and bis-(para-hydroxyphenyl)-dimethylmethane; polyester resins such as copolymers of maleic anhydride with propylene glycol and mixtures of polyester resins with vinylic resins such as styrene or methylmethacrylate.

It should be understood that the compositions of this invention are useful in other applications than those shown above, for example, they can be used to modify conventional organic epoxy resins for use as protective coatings and in electrical varnishes or they can be used per se as laminating resins.

The following examples are illustrative only and should not be construed as limiting the invention which is properly delineated in the appended claims. The abbreviation Me is used herein for the methyl radical.

*Example 1*

The epoxy resin employed in this example was an epoxidized polybutadiene having a viscosity of 16,000 c.p.s. at 25° C., an average molecular weight of 1,000 and having an epoxy equivalent weight * of 145 and an iodine number of 154. This resin also contained a small amount of hydroxyl groups and acetate ester groups, the latter two being formed as a by-product of the interaction of the peracetic acid with epoxy groups.

100 g. of this epoxy resin was dissolved in 100 g. of toluene and 10 drops of a solution of chloroplatinic acid in dimethylphthalate (which solution contained 1 percent by weight platinum) was added. 61 g. of trimethoxysilane was then added and the mixture was refluxed for 5 hours. During this time the reflux temperature rose from 90 to 109° C. The product was then heated to 90° C. at 20 mm. to remove solvent and unreacted trimethoxysilane. The product weighed 113 g. and was a clear viscous oil which contained 2.5 percent by weight combined silicon. This product had per molecule an average of 1 trimethoxysilyl group per 7 epoxy groups and an average of 1 trimethoxysilyl group per 5 unreacted C=C groups.

---

* Number of grams of resin containing 1 gram mole of epoxide group.

*Example 2*

100 g. of the epoxy resin of Example 1 was mixed with 100 g. toluene, 40 drops of the platinum catalyst of Example 1 and 8 g. of trimethoxysilane. The mixture was refluxed for 20 hours and then stripped volatile-free by heating up to 160° C. at 30 mm. The product was a viscous oil having an average per molecule of 1 trimethoxysilyl group per 10 epoxy groups and 1 trimethoxysilyl group per 8 unreacted C=C groups.

*Example 3*

100 g. of the epoxy resin of Example 1 was mixed with 100 g. of toluene, 20 drops of the platinum catalyst of Example 1 and 38 g. of trimethoxysilane. The mixture was refluxed for 6 hours and then stripped by heating at 120 C. at 15 mm. The product was a viscous oil weighing 114 g.

*Example 4*

40 g. of the epoxy resin of Example 1 was mixed with 50 g. of toluene, 10 drops of the platinum catalyst of Example 1 and 100 g. of dimethylmonoacetoxysilane. The mixture was refluxed for 4 hours and then stripped by heating up to 140° C. at 5 mm. The residue weighed 68 g. This product was a viscous fluid which had on the average per molecule 2 dimethylmonoacetoxylsilyl groups per 3 epoxy groups.

*Example 5*

55 g. of the epoxy resin of Example 1 was mixed with 55 g. of toluene, 20 drops of the platinum catalyst of Example 1 and 24 g. of methyldiacetoxylsilane. The mixture was refluxed for 20 hours and then stripped by heating to 120° C. at 20 mm. The residue was a viscous oil which had on the average per molecule 1 methyldiacetoxysilyl group per unreacted C=C group and 1 methyldiacetoxysilyl group per 4 epoxy groups.

*Example 6*

The epoxy resin employed in this example was an epoxidized butadiene polymer having a viscosity of 1,800,000 c.p.s. at 25° C., an epoxy equivalent of 177 and an iodine number of 185.

50 g. of this epoxy resin was mixed with 50 g. of toluene, 20 drops of the platinum catalyst of Example 1 and 75 g. of trimethoxysilane. The mixture was refluxed for 6 hours, then stripped by heating to 130° C. at 3 mm. The viscous residue weighed 63 g. and contained on the average per molecule 1 trimethoxysilyl group per 3 epoxy groups and 1 trimethoxysilyl group per 2.6 unreacted C=C groups.

*Example 7*

Each of the products of Examples 1 through 6 was dissolved in toluene and heat cleaned 181 glass cloth was immersed in each solution. Each cloth was then air dried 30 minutes at room temperature and then heated 7 minutes at 230° F. The weight pickup of the silylated polyepoxide resin was determined and is recorded in the table below.

These treated cloths were laminated with a polyester resin and an epoxy resin as shown below. In each case the treated cloth was impregnated with the organic resin and the impregnated cloth was then stacked into a 14 ply laminate. The laminate was then cured as shown below and the flexural strength of the cured product was determined (dry strength). The laminate was then immersed in boiling water for 2 hours, removed from the hot water and immediately immersed in cold water. The laminate was removed from the cold water, wiper dry, and immediately tested for flexural strength.

The compressive strength of each sample was determined immediately after cure.

The polyester resin employed was a commercial material which was a copolymer of propylene glycol and an equimolar mixture of phthalic and maleic acids. The total equivalent weights of the acids was in slight excess over the equivalent weight of the propylene glycol. The polyester was used in the form of a mixture of 70 percent by weight polyester and 30 percent by weight styrene.

The catalyst employed to cure the polyester resin was benzoyl peroxide which was used in the amount of .5 percent by weight benzoyl peroxide based on the weight of the total polyesterstyrene mixture.

This resin was used to impregnate the glass cloth and the laminate was molded 30 minutes at 100° C. under 30 p.s.i. and thereafter cured in an oven 6 to 7 mintues at 110° C.

The epoxy laminating resin employed below was a commercial material consisting of a condensation product of 2 moles of epichlorohydrin and 1 mole of bis(para-hydroxyphenyl)dimethylmethane. This polymer had an epoxide equivalent weight of 187 to 193.

The epoxy resin laminates were cured in a press 30 minutes at 150° C. The catalyst employed was meta-phenylenediamine which was used in amount 13 percent by weight based on the weight of the epoxy resin.

TABLE I.—POLYESTER RESIN

| Composition | Percent by wt. compositions on glass | Flexural strength, p.s.i. | | Compressive strength, p.s.i., dry |
|---|---|---|---|---|
| | | Dry | After 2 hr. boil | |
| Example 1 | 1.60 | 73,200 | 71,400 | |
| | .40 | 61,300 | 74,000 | |
| Example 2 | | 88,300 | 76,000 | 52,000 |
| Example 3 | 0.65 | 83,100 | 68,900 | 47,800 |
| Example 4 | 0.65 | 84,000 | 71,000 | 50,800 |
| Example 5 | | 67,300 | 65,100 | 36,800 |
| Example 6 | | 89,850 | 73,800 | 44,970 |

EPOXIDE RESIN

| Example 1 | 0.65 | 76,900 | 70,200 | 45,700 |

Example 8

When the following epoxides are reacted with the following silanes in accordance with the procedure of Example 1, the following products are obtained.

TABLE II

| Epoxide | Silane | Product |
|---|---|---|
| 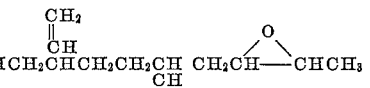 | H MeSi(OOCH)₂ | 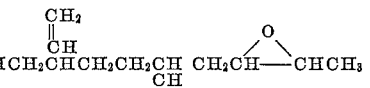 |
| 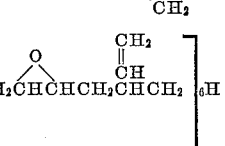 | HSi(OC₃H₇)₃ | 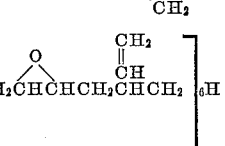 |
| 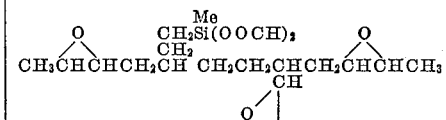 | HSi(OOCC₂H₅)₃ | 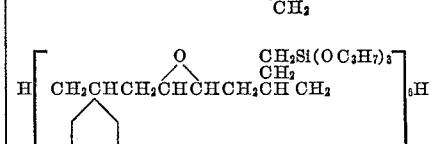 |

Example 9

Improved molded articles are obtained when the following organic resins are employed in the procedure of Example 7:

(1) A copolymer of 1 mol styrene and 4 mols butadiene
(2) Styrene
(3) A copolymer of 1 mol of vinylchloride and 4 mols of butadiene
(4) Methylmethacrylate

Example 10

Improved molded articles are obtained when the following siliceous materials are employed in the procedure of Example 7: silica fibers, sand, asbestos, aluminum silicate powder and mica.

Example 11

53 g. of the epoxy resin of Example 1, 40 g. of vinyltrimethoxy silane, 1 g. of the peroxide

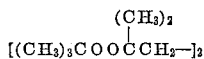

were refluxed for 4 hours as the temperature rose from 130–140° C. The resulting product was stripped on an evaporator by heating to a temperature of 80° C. at 15 mm. The residue was a viscous yellow oil which contained 3.4% by weight combined silicon. There was an average of 1.4 trimethoxysilyl groups per 7 epoxide groups in the product.

A 1% by weight toluene solution of the product was applied to 181 glass cloth and the treated cloth was cured, laminated, and tested as shown in Example 7. The properties of the resulting cured laminates employing the polyester resin of Example 7 were as follows: flexural strength, dry, 78,300 p.s.i., after a two hour boil, 67,200 p.s.i. and compressive strength, dry, 42,400 p.s.i.

The treated glass cloth was also laminated with the epoxide resin of Example 7. The cured laminates had the following properties: flexural strength, dry, 82,800 p.s.i., after a 2 hour boil 68,400 p.s.i. and the compressive strength, dry, 42,700 p.s.i.

Example 12

108 g. of the epoxy resin of Example 1, 92 g. of vinyltrimethoxy silane and 1 g. of the peroxide of Example 11 were refluxed for 3 hours at 128–130° C. 1 g. more of the peroxide was then added and the mixture was refluxed an additional 3 hours. A third 1 g. portion of the peroxide was then added and the mixture was again refluxed for 3 hours. The resulting product was stripped to 80° C. at 5 mm. The resulting viscous oil contained 5.5% by weight combined silicon and had 2.5 trimethoxysilyl groups and 7 epoxy groups per molecule.

This material was applied to 181 glass cloth as shown in Example 7 and the treated cloth was cured, laminated and tested with the polyester resin of that example and the cured laminates had the following properties: flexural strength, dry, 93,700 p.s.i., after a 2 hour boil, 90,000 p.s.i., and compressive strength, dry, 47,700 p.s.i.

That which is claimed is:

1. A silylated polyepoxide in which each silyl moiety is selected from the group consisting of radicals of the formula

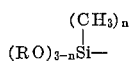

which are attached to the epoxy moiety through a SiC linkage and radicals of the same formula which are attached to the epoxy moiety through an alkylene bridge derived from at least one silicon bonded alkenyl group, in which R is selected from the group consisting of monovalent aliphatic hydrocarbon radicals and monovalent monocarboxyacyl radicals, both of less than 4 carbon atoms and $n$ is an integer from 0 to 2 inclusive, said epoxy moiety being composed of carbon, hydrogen and oxygen atoms, the latter being in the form of 1,2-epoxy groups, in said silylated polyepoxide there being per molecule at least 3 epoxy groups and at least 1 of said silyl groups.

2. A silylated polyepoxide in which each silyl moiety is selected from the group consisting of radicals of the formula

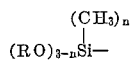

which are attached to the epoxy moiety through a SiC linkage and radicals of the same formula which are attached to the epoxy moiety through an alkylene bridge derived from at least one silicon bonded alkenyl group, in which R is selected from the group consisting of monovalent aliphatic hydrocarbon radicals and monovalent monocarboxyacyl radicals, both of less than 4 carbon atoms and $n$ is an integer from 0 to 2 inclusive, said epoxy moiety being composed of carbon, hydrogen and oxygen atoms, the latter being in the form of 1,2-epoxy groups, in said silylated polyepoxide there being per molecule at least 3 epoxy groups, at least 1 of said silyl groups and at least 1

group.

3. A siliceous material coated with a thin coating of a composition of claim 1 in amount of at least .1 percent by weight based on the weight of the siliceous material.

4. A siliceous material coated with a thin coating of a composition of claim 2 in amount of at least .1 percent by weight based on the weight of the siliceous material.

5. Glass fibers coated with a thin film of a composition of claim 1 in amount of at least .1 percent by weight based on the weight of the glass fibers.

6. Glass fibers coated with a thin film of a composition of claim 2 in amount of at least .1 percent by weight based on the weight of the glass fibers.

7. A molded article of superior strength comprising a siliceous filler having adjacent the surface of said filler a thin coating of a composition of claim 1 in amount of at least .1 percent by weight based on the weight of the filler and over said thin coating, directly bonded to said coating a cured organic resin selected from the group consisting of unsaturated polyester resins and 1,2-epoxy resins.

8. A molded article of superior strength comprising a siliceous filler having adjacent the surface of said filler a thin coating of a composition of claim 2 in amount of at least .1 percent by weight based on the weight of the filler and over said coating, directly bonded to said coating a cured organic resin selected from the group consisting of unsaturated polyester resins and 1,2-epoxy resins.

9. A laminate of superior strength comprising multilayers of glass fibers which fibers have been coated with a thin coating of a composition of claim 2 in amount of at least .1 percent by weight of the weight of the glass fibers and over said coating directly bonded to said coating, a cured polyester resin.

10. A method of preparing a molded article of superior strength which comprises applying to the surface of a siliceous filler at least .1 percent by weight of a composition of claim 1, based on the weight of the filler, impregnating said coated filler with an organic resin selected from the group consisting of unsaturated polyester resins and 1,2-epoxy resins and thereafter curing the resin to consolidate the article.

11. The method of preparing a molded article of superior strength which comprises mixing a siliceous filler, a composition of claim 1 in amount of at least .1 percent by weight based on the weight of the filler and an organic resin selected from the group consisting of unsaturated polyester resins and 1,2-epoxy resins and thereafter heating the mixture to consolidate the article.

References Cited by the Examiner

UNITED STATES PATENTS

| | | | |
|---|---|---|---|
| 2,768,150 | 10/1956 | Millar et al. | 260—42 |
| 2,773,048 | 12/1956 | Formo et al. | 260—47 |
| 2,819,245 | 1/1958 | Shorr | 260—42 |
| 2,951,860 | 9/1960 | Plueddemann | 260—2 |
| 3,022,322 | 2/1962 | Wheelock et al. | 260—2 |
| 3,030,336 | 4/1962 | Greenspan et al. | 260—2 |

FOREIGN PATENTS

| | | |
|---|---|---|
| 737,142 | 9/1955 | Great Britain. |
| 202,308 | 6/1956 | Australia. |
| 202,627 | 7/1956 | Australia. |

ALEXANDER WYMAN, *Primary Examiner.*

M. STERMAN, *Examiner.*